Nov. 11, 1952  H. J. NICHOLS  2,617,672
COUPLING
Filed June 23, 1948
FIG. I
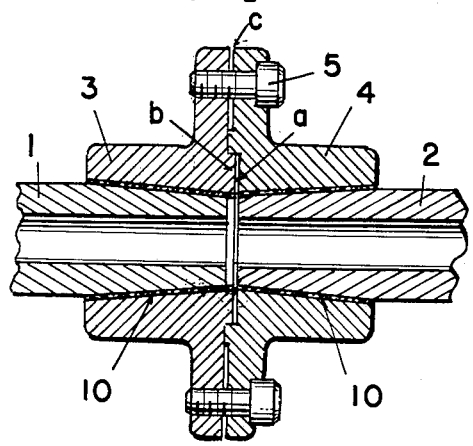
FIG. II
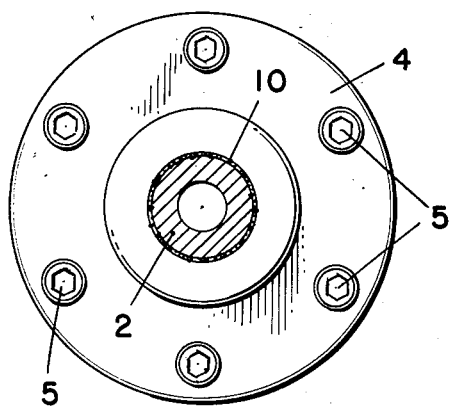
FIG. III
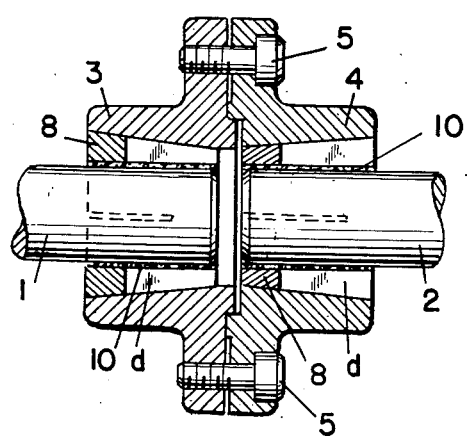
FIG. IV
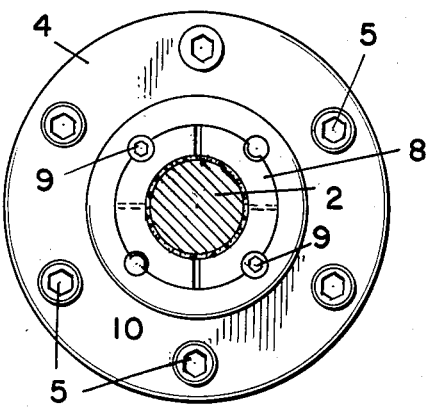
FIG. VI
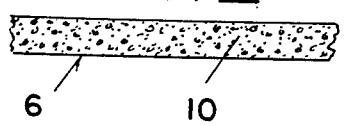
FIG. V
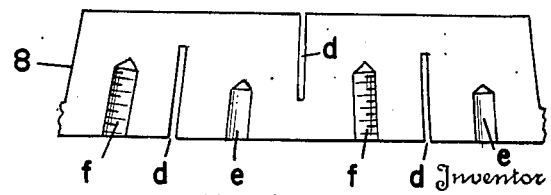
FIG. VII
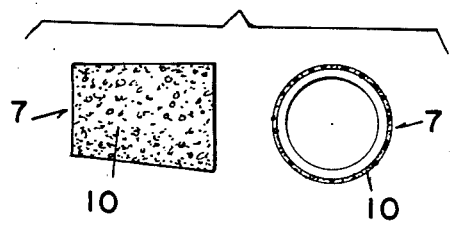
Inventor
HARRY J. NICHOLS,
By  J Harold Kilcoyne
ATTORNEY Patented Nov. 11, 1952

2,617,672

UNITED STATES PATENT OFFICE 2,617,672

COUPLING

Harry J. Nichols, Point Pleasant, N. J.

Application June 23, 1948, Serial No. 34,641

1 Claim. (Cl. 287—20.3)

This invention relates to demountable flange couplings and more particularly to a novel and versatile demountable flange coupling, termed a "myriad-lock" coupling, adapted in various embodiments for coupling power or torque transmission shafts, both solid and hollow; and for coupling conduits, including those intended to conduct fluids under pressure.

In the prior art, there have been many forms of demountable flange couplings, but in general those forms of coupling intended to transmit power or torque have been provided with some sort of auxiliary device, such as a key, spline, set-screw, or pin, for transmitting torsional and axial forces from the shaft to the flange and vice versa. The present invention departs from prior practice by eliminating such conventional auxiliary force transmitting devices, and utilizing new means which provide an equal or superior force transmitting positive connection between the shaft and coupling. Besides eliminating the cost of providing and fitting such auxiliary devices, the present invention provides the important advantage of avoiding any cutting of the shaft such as would tend to reduce its strength.

With respect to demountable flange couplings for conduits containing fluids under pressure, a cardinal requirement is that the demountable connection between the conduit and flange must be fluid tight. Ordinarily, this requirement is met by a threaded joint having tapered threads, that is pipe threads. As will appear from the following description, the present invention fully meets that requirement, as well as the other requirements of good practice.

A general object of the invention is to provide a method and suitable apparatus for carrying the method into effect, which will enable a shaft, conduit, pipe, or tube, hereinafter termed a shaft member, to be rigidly coupled, and subsequently uncoupled, to an adjacent structure in a simple, strong, inexpensive and fluid tight manner.

Another object is to provide demountable means for coupling two shaft members which eliminates the need for any key, spline, set-screw, or coupling-pin to transmit torque therebetween.

Another object is to provide means for coupling shaft members, either solid or hollow, which avoids cutting a key-way or hole in the shaft member, thus avoiding any impairment of the strength of the latter.

A further object is to provide simple coupling means whereby a combination of compressive and frictional forces are augmented by the locking action of a myriad of embedded grains of abrasive material and utilized to effect a strong, positive, and fluid tight connection of a collar member to a shaft member.

A further object is to provide a grit composition in different forms adapted to carry the invention in effect for various applications.

Other objects and features will be in part obvious, and in part hereinafter pointed out in connection with the following description, the accompanying drawings, and the appended claim.

The invention will be more clearly understood from consideration of the following description relating to two embodiments of the invention, and of the drawings in which:

Fig. I shows in axial cross-section one embodiment of the invention.

Fig. II shows a right end view of the construction shown in Fig. I.

Fig. III shows in axial cross-section another embodiment of the invention.

Fig. IV shows a right end view of the construction shown in Fig. III.

Fig. V shows a planar development of the outer perimeter of the collet member comprising part of the construction of Figs. III and IV, thereby to illustrate certain features of that member.

Fig. VI shows a plastic tape vehicle for applying a grit composition to the mating members of a coupling.

Fig. VII shows longitudinal end views of a preformed solid vehicle for the same purpose.

Referring to Fig. I, the demountable double-flange coupling there shown illustrates the application of the invention to coupling rigidly and tightly a shaft member 1, such as hollow propeller shaft or tube, to another similar shaft member 2. Two circular collar members 3 and 4, like those of a simple double-flange coupling, comprise the easily and quickly separable members of the coupling. The two collar members are adapted to be fastened rigidly and tightly together by plural cap screws 5, as shown, or by conventional through bolts, following common practice. One of the collar members is preferably provided with a short circular projection $a$, and the other with a shallow circular socket $b$, according to common practice, thereby to align the collar members in coaxial relation. The inner face of one of the collar members is partly cut back a small distance so as to provide a gap $c$, thereby to concentrate the compressive force of the fasteners on a limited annular area of the faces of those members, as shown. In this embodiment, in which the shaft members are assumed to be rigidly and semi-permanently attached to their respective collar members, the ends of the shaft members are provided with a slight taper, say one-half to three-quarters of an inch per linear foot. The collar members are provided with similarly tapered coaxial bores adapted to mate with the shaft members when engaged therewith. A grit composition, descibed hereinafter, containing as the invariable ingredient abrasive grains of controlled size, is applied between the mating surfaces of the shaft member and collar member, so that a myriad of such grains are embedded in the mating surfaces.

The assembly of the parts of the coupling is preferably effected as follows: The grit composition is distributed evenly over at least one of the tapered surfaces of each mating pair, the abrasive grains contained in said composition being at this stage of the assembly in wholly discrete relationship to said surface or surfaces. Then the tapered end of the shaft member is inserted in the tapered bore of the collar member, and the two are pressed or hammered together with sufficient force to cut the abrasive grains into the mating parts as these are forced substantially into contact, due to the wedging coaction of the two mating members. The abrasive grains thereby become embedded partly in the shaft member and partly in the collar member, in effect forming a myriad of tiny keys which hold those members together with greater force and rigidity than an ordinary forced or shrunk-on fit. This operation is repeated for each mating pair. The assembly of the coupling is completed by fastening the collars tightly together by means of the cap screws provided, or alternatively by through bolts.

The various parts can be disassembled by reversing the order of operations. By removing the fasteners the collars can be separated. By applying sufficient axial force in the direction reverse to that used at assembly, each shaft member can be separated from its collar member without damage. The parts can be reassembled in the same manner without refitting.

It has been found by experiment that the axial force required to separate the mating parts is only slightly less than that used to assemble them. Hence, the axial force in tension which the tapered joint will withstand, up to a certain maximum, can be predetermined in any particular case by regulating the axial force used at assembly. The torsional force which the tapered joint will transmit can likewise be predetermined by regulating the axial force used at assembly. By application of the proper axial force, the maximum torsional strength of the tapered joint can be brought up to substantially the torsional force which the shaft itself will transmit. Since it is established that the strength of a shaft in torsion may be reduced as much as 20% by cutting in it a key-way of the usual proportions, it follows from the above that a tapered joint made according to the invention can exceed the capacity of a similar keyed shaft with respect to transmitting torque.

The grit composition comprises in general hard abrasive grains of controlled size and a vehicle for those grains. While abrasive grains of various materials, such as emery, silicon carbide, aluminum oxide, carborundum, etc., may be used to carry out the invention, the preferred abrasive material is artificial corundum, since this material is not only hard enough to cut into any common metal or alloy, but it is also exceedingly tough and resists the great forces tending to crack the grains which are produced when hard and strong metals are forcibly wedged together under heavy axial pressure, according to the invention.

It has been found that good results are obtained by using abrasive grain sizes known commercially as Grit No. 24 to Grit No. 36 for joining non-ferrous metals, and Grit No. 36 to Grit No. 54 for joining ordinary ferrous metals. However, other grit sizes may be employed, according to circumstances.

With respect to the vehicle for the grit, good results have been obtained by using a liquid lute consisting of red-lead or white-lead paste thinned somewhat with boiled linseed oil, into which the grit is stirred until a consistency is obtained which will adhere to metal surfaces without dripping. In the process of assembly, the grit-loaded lute is conveniently spread on the tapered end of the shaft, and then upon insertion in the bore of the collar, one mating part is rotated to distribute the grit evenly. The grit-loaded lute is of course extremely abrasive, and therefore all excess lute should be removed after the tapered joint is made to avoid any possible damage to working parts therefrom.

While the liquid lute described above is quite satisfactory for making tight joints suitable for withstanding the action of water or steam under ordinary conditions, the invention is not limited to the use of liquid lutes as a vehicle for the grit. It is contemplated that under some conditions where the invention will be used, other vehicles for the grit may be desirable or necessary. It is contemplated, for example, that a vehicle comprising liquid silicone or silicone putty may be used advantageously for high temperature installations.

In the example illustrated in Fig. VI, the vehicle for the grit consists of a pliant tape 6, made for example of a plastic composition, in which the grit 10 may be embedded, or carried on one surface by causing the grit to adhere thereto, in the well-known manner of sand-paper, emery-cloth, etc. Preferably, the back side of the tape is coated with an adhesive composition, to cause the tape to adhere to any surface to which it may be applied. In carrying the invention into effect, the tape would, for example, be wound spirally and smoothly around the end of the shaft, any projecting excess tape being trimmed off. Upon insertion of the shaft in the bore of the collar, the tape will at first hold the grit in evenly distributed position, and then as the grit engages the mating surfaces of the joint, the grit will hold the tape immovably in position. An advantage of the adhesive tape vehicle for the grit in general use is that there would be less possibility of the grit composition going astray.

Another example of a vehicle for the grit is shown in Fig. VII. In this example, the grit 10 is embedded in a thin conical shell 7 of solid material, such for instance as plastic composition, adapted to fit tapered shaft ends of certain sizes. Such a preformed grit vehicle will have obvious examples in the quantity production of devices or machines utilizing the invention.

Referring now to Figs. III to V, which illustrate another embodiment of the invention, in this example a shaft member of right cylindrical exterior form may be accommodated. This embodiment illustrates a readily demountable construction in which the shaft member can be joined to the collar member without hammering or the use of a press, by the means provided. This same means can also be used to disjoin the shaft from the collar without breaking the joint between the flanges. The collar members 3 and 4 are each provided with a tapered bore, as in the prior example, but in this case the bore is proportionally larger and adapted to receive a tapered, circumferentially contractible wedge 8, in the form of an annulus, herein termed a collet from its similarity of form and function to draw collets commonly used to grip and hold any rod-like body. The collet is provided with a truly cylindrical axial bore, normally somewhat larger in diameter than the outside diameter of the shaft member which it is intended to accommodate. The collet is preferably provided with one or more longitudinally extending blind slots d, and two or more half-cylindrical blind recesses e, f, as shown clearly in Fig. V, which figure shows the collet as though broken along one longitudinal plane, and spread out flat with the outside surface uppermost.

It should be noted that the slots d extend from opposite ends of the collet, and the recesses extend from the large end of the collet. The recesses f are provided with half-threads. Each flange is provided with blind recesses located to match those in the collet, and when so matched a pair of recesses form a cylindrical hole; but in respect to being threaded or unthreaded the two sets of recesses are reversed. A pair of headless set-screws 9 are also provided, these being adapted to screw into any pair of recesses when matched in position. This well-known construction enables the set-screws to be utilized as jack screws, first to draw the collet into the tapered bore of the collar, and then by shifting the screws to the other set of holes, to withdraw the collet from the collar.

In this embodiment, the assembly is preferably accomplished as follows: The grit composition is applied evenly to the end of the shaft, the adhesive tape vehicle for the grit being preferred for this embodiment. The collet is then slid into position on the shaft. The collet and shaft are next inserted in the bore of the collar, the recesses brought into register, and the set-screws inserted in the draw holes. The set-screws are then turned in evenly and tightly to draw the collet tightly into the tapered bore of the collar. In drawing the collet into the tapered bore, a powerful inwardly acting radial pressure, produced by the wedging coaction of the tapered parts, can be exerted on the collet, thereby contracting it with great force. Thereby, the shaft will be powerfully gripped as the grit cuts into the shaft and collet, as in the prior example. The set-screws hold the collet and collar rigidly together.

The operation is then repeated for the other shaft and collar, and then the collars are fastened together as before. The parts can be disassembled by reversing the order of operations; or alternatively, the collets can be removed without unfastening the collars by moving the set screws to the draw-out holes and using them as jack screws.

Referring to Fig. V, it should be noted that the slots in the collet are so arranged that the collet has a continuous section. Therefore, when the collet is drawn tightly into the tapered bore in the collar, a tight joint results at both the inner and outer peripheries of the collet. Thus, in both embodiments, the coupling is constructed so as to provide a fluid tight joint after assembly.

The advantages gained by the second construction are, (1) the end of the shaft member need not be tapered, (2) the shaft member can be coupled to and uncoupled from the collar by means of a simple hand tool, (3) a shaft member can be removed or recoupled without breaking the flange joint. Against these advantages are the added cost of providing and fitting the additional parts.

It clearly follows from the foregoing that the two embodiments can be combined in various ways. For one example, one section of the double flange coupling can be constructed according to the first embodiment, and the other section according to the second embodiment. For another example, the recesses in the collet and the set-screws of the second embodiment can be omitted, and the collet can be locked in the collar by applying grit composition to the tapered joint and wedging the parts together as in the first embodiment. In this case, the tapering of the shaft member would be avoided.

Without further analysis, the teaching of the invention and various modes of putting the invention into practice will be evident from the foregoing.

While the methods described herein, and the forms of apparatus for carrying these methods into effect, constitute preferred embodiments, it is to be understood that the invention is not limited to these and that changes may be made in either without departing from the scope of the invention which is defined in the appended claim.

What is claimed is:

A demountable keyless shaft coupling device including, in combination, a shaft member having a tapered end portion, a flanged coupling member having a complementally tapered bore receiving said end portion with tight frictional engagement throughout the mating surfaces of said members, and means for positively locking said shaft and said coupling members against relative rotation in tortion comprising a grit composition consisting principally of abrasive grains of predetermined, substantially uniform size and of greater hardness than said shaft and said coupling members, said grains being distributed over the mating surfaces of said shaft and said coupling members in initially discrete relationship with respect to both said members and being embedded in the mating surfaces of both said members whereby said grains provide a multiplicity of small individual keys operative between said shaft and said coupling members which lock said members together in positive but demountable relation.

HARRY J. NICHOLS.

REFERENCES CITED

The following references are of record in the file of this patent:

UNITED STATES PATENTS

| Number | Name | Date |
| --- | --- | --- |
| 81,986 | Crane | Sept. 8, 1868 |
| 217,300 | Starr | July 8, 1879 |
| 298,317 | Sherman | May 6, 1884 |
| 303,251 | Almond | Aug. 12, 1884 |
| 404,824 | Clark et al. | June 11, 1889 |
| 668,017 | Pessano | Feb. 12, 1901 |
| 807,926 | Hendershot | Dec. 19, 1905 |
| 1,821,867 | Wilson | Sept. 1, 1931 |
| 2,081,021 | Smith et al. | May 18, 1937 |
| 2,149,209 | Dickie et al. | Feb. 28, 1939 |
| 2,201,684 | Kingsbury | May 21, 1940 |
| 2,251,709 | Klein | Aug. 5, 1941 |
| 2,279,677 | Heinrich | Apr. 14, 1942 |
| 2,328,998 | Radford | Sept. 7, 1943 |